United States Patent
Ethier et al.

(10) Patent No.: US 8,589,563 B2
(45) Date of Patent: Nov. 19, 2013

(54) SYSTEM, METHOD, AND APPARATUS FOR MAINTAINING CALL STATE INFORMATION FOR REAL-TIME CALL SESSIONS

(75) Inventors: Randall P. J. Ethier, Burke, VA (US); Michael P. Hammer, Reston, VA (US)

(73) Assignee: Cisco Technology, Inc., San Jose, CA (US)

( * ) Notice: Subject to any disclaimer, the term of this patent is extended or adjusted under 35 U.S.C. 154(b) by 1439 days.

(21) Appl. No.: 11/775,305

(22) Filed: Jul. 10, 2007

(65) Prior Publication Data

US 2009/0016323 A1 Jan. 15, 2009

(51) Int. Cl.
*G06F 15/16* (2006.01)
*H04M 3/42* (2006.01)

(52) U.S. Cl.
USPC ..................................... 709/227; 379/201.01

(58) Field of Classification Search
USPC .............. 709/227–228; 455/414.1; 379/201.1
See application file for complete search history.

(56) References Cited

U.S. PATENT DOCUMENTS

| | | | |
|---|---|---|---|
| 4,685,125 A | 8/1987 | Zave | 379/96 |
| 5,630,142 A | 5/1997 | Crump et al. | 395/750 |
| 5,689,715 A | 11/1997 | Crump et al. | 395/750 |
| 5,715,464 A | 2/1998 | Crump et al. | 395/750 |
| 5,752,044 A | 5/1998 | Crump et al. | 395/750 |
| 5,758,174 A | 5/1998 | Crump et al. | 395/750.05 |
| 6,081,752 A | 6/2000 | Benson, IV et al. | 700/79 |
| 6,091,951 A * | 7/2000 | Sturniolo et al. | 455/432.2 |
| 6,574,239 B1 * | 6/2003 | Dowling et al. | 370/469 |
| 7,016,479 B2 * | 3/2006 | Flathers et al. | 379/52 |
| 7,277,945 B1 * | 10/2007 | Shah et al. | 709/226 |
| 7,471,774 B2 * | 12/2008 | Patel et al. | 379/76 |
| 7,747,688 B2 * | 6/2010 | Narayanaswami et al. | 709/204 |
| 2002/0173905 A1 * | 11/2002 | Jin et al. | 701/207 |
| 2004/0107208 A1 * | 6/2004 | Seet et al. | 707/102 |
| 2005/0068889 A1 * | 3/2005 | Chavez et al. | 370/225 |
| 2007/0033646 A1 * | 2/2007 | Tosey et al. | 726/15 |
| 2007/0091848 A1 | 4/2007 | Karia et al. | 370/331 |
| 2007/0091907 A1 | 4/2007 | Seshadri et al. | 370/401 |
| 2007/0094374 A1 | 4/2007 | Karia et al. | 709/223 |
| 2007/0263829 A1 * | 11/2007 | Burg et al. | 379/215.01 |
| 2008/0081627 A1 * | 4/2008 | Shan et al. | 455/445 |
| 2008/0243999 A1 * | 10/2008 | Pazhyannur et al. | 709/203 |

OTHER PUBLICATIONS

Cisco, SIP Call Flows, Sep. 22, 2006.*
Rosenberg, et al., RFC 3261—SIP: Session Initiation Protocol, Jun. 2002.*
Elwell et al., State update during a SIP dialog, Jun. 2004.*

* cited by examiner

*Primary Examiner* — Joseph Avellino
*Assistant Examiner* — James Conaway
(74) *Attorney, Agent, or Firm* — Baker Botts L.L.P.

(57) ABSTRACT

A method for facilitating communication sessions includes establishing a communication session between a first endpoint and a second endpoint, sending a hibernation message from the first endpoint, and receiving the hibernation message by the second endpoint. The method further includes storing, by the first and second endpoint, session state information associated with the communication session in response to receiving the hibernation message, and deactivating at least a portion of the communication session. After storing the session state information by the first and second endpoints, the method further includes retrieving the session state information by the first and second endpoints, and reestablishing the deactivated portion of the communication session.

37 Claims, 2 Drawing Sheets

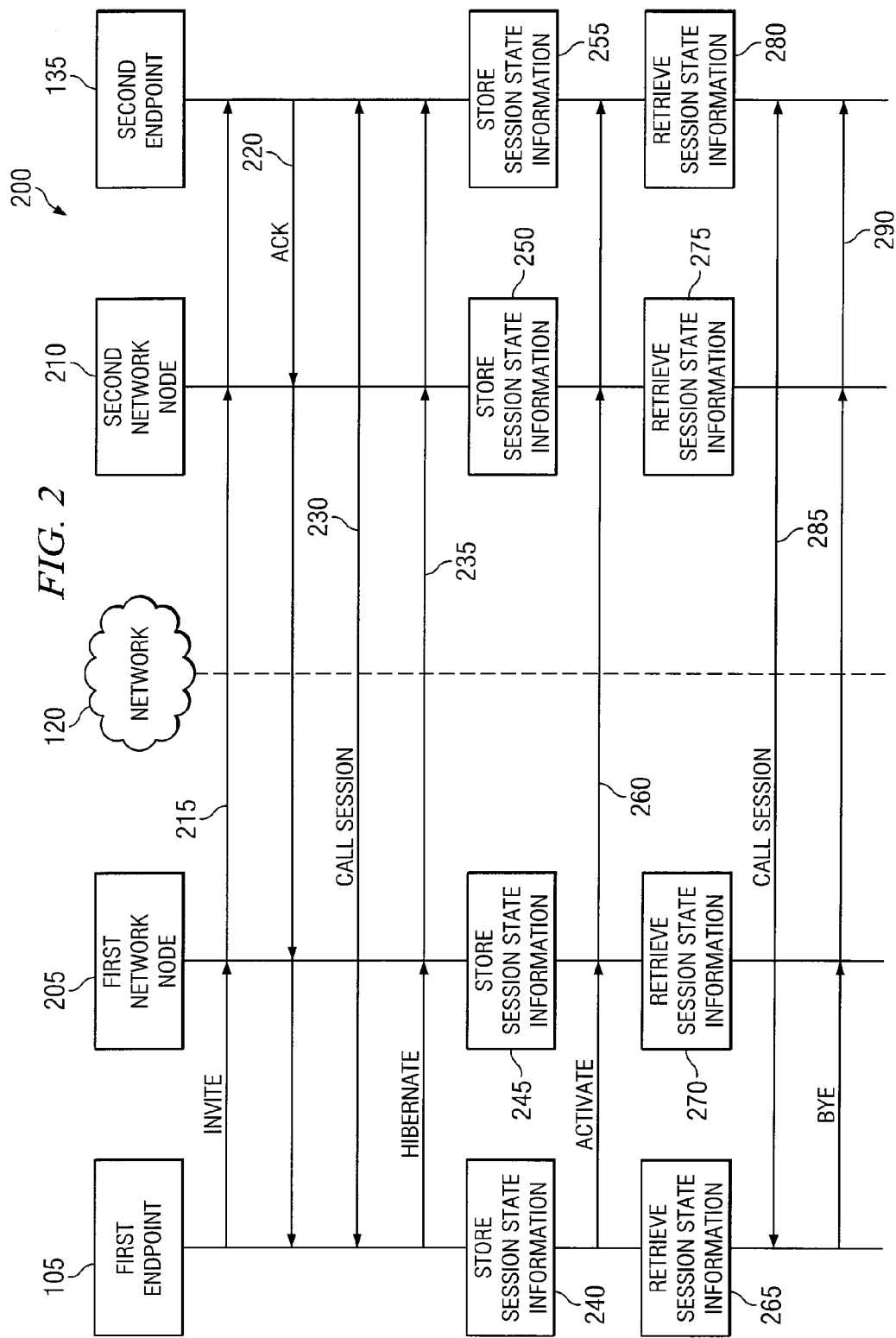

SYSTEM, METHOD, AND APPARATUS FOR MAINTAINING CALL STATE INFORMATION FOR REAL-TIME CALL SESSIONS

TECHNICAL FIELD OF THE INVENTION

This invention relates in general to real-time communication sessions, and more particularly, to maintaining call state information for real-time communication sessions.

BACKGROUND OF THE INVENTION

The establishment of real-time call sessions such as Voice Over IP (VoIP) between endpoints in a communication network requires the performing of a call-setup procedure before the call session can begin. During the call-setup procedure, call session invite and acknowledgement messages are exchanged between the endpoints. The need for performing a call-setup procedure causes delays in establishing the call session. In addition, substantial network resources are consumed during the call-setup stages of a call session.

OVERVIEW

In accordance with one embodiment of the present disclosure, there is provided a method for facilitating communication sessions including establishing a communication session between a first endpoint and a second endpoint, sending a hibernation message from the first endpoint, and receiving the hibernation message by the second endpoint. The method further includes storing, by the first endpoint, session state information associated with the communication session, and storing, by the second endpoint, the session state information in response to receiving the hibernation message. The method further includes deactivating at least a portion of the communication session, and after storing the session state information by the first and second endpoints, retrieving the session state information by the first and second endpoints and reestablishing the deactivated portion of the communication session between the first and second endpoints.

In accordance with another embodiment of the present invention, there is provided a method for facilitating communication sessions including a receiving a hibernation message by at least one network node. The method further includes storing, by the at least one network node in response to receiving the hibernation message, session state information associated with a communication session established between a first endpoint and a second endpoint, and deactivating at least a portion of the communication session. After storing the session state information, the method further includes retrieving the stored session state information by the at least one network node and reestablishing the deactivated portion of the communication session.

In accordance with another embodiment, a network node includes at least one processor. The at least one processor is operable to receive a hibernation message, and store, in at least one storage device, session state information associated with a communication session established between a first endpoint and a second endpoint in response to receiving the hibernation message. The at least one processor is further operable to deactivate at least a portion of the communication session, retrieve the stored session state information after storing the session state information, and reestablish the deactivated portion of the communication session.

In accordance with another embodiment, logic for facilitating call sessions is embodied in computer-readable storage media and when executed by a computer operable to receive a hibernation message by at least one network node, and store, by the at least one network node, session state information associated with a communication session established between a first endpoint and a second endpoint in response to receiving the hibernation message. The logic is further operable to deactivate at least a portion of the communication session, and after storing the session state information, retrieve the stored session state information by the at least one network node and reestablishing the deactivated portion of the communication session.

Important technical advantages of certain embodiments of the present invention include rapid setup of a call session which provides benefits to end users and optimization of network session resources. Providing "always-on" real-time sessions with a hibernation mode can reduce the delay associated with the establishment of active sessions and optimize use of session establishment resources in a network. Other important technical advantages of certain embodiments of the present invention include shifting resource utilization from relatively expensive storage such as RAM or CPU to less expensive long-term storage such as hard disk.

Other technical advantages of certain embodiments of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 2 is a simplified signalling diagram of a procedure for maintaining call state information for a call session in accordance with an embodiment of the present invention.

DETAILED DESCRIPTION

The establishment of real-time call sessions such as Voice Over IP (VoIP) between endpoints in a communication network suffer from session establishment delay during call-setup. In addition, substantial network resources are consumed during the call-setup stages of a call session. Network resources in support of real-time session services are often a function that is performed during peak traffic periods. If the call-setup procedures needed prior to establishing real-time sessions that are typically performed during peak traffic periods could be performed during less busy periods, the peak busy periods could be supported in a more cost effective manner.

In various embodiments of the invention, call-setup is performed at some time prior to when a call session is conducted, and session state information associated with the call session is stored in a hibernation mode. In various embodiments, the call session state information is retrieved in an active mode at the time that the call session is to be established. In various embodiments, the storing of session state information in a hibernation mode may reduce the delay associated with the establishment of active session, and may increase the optimal use of session establishment resources in a network.

Figure 1:
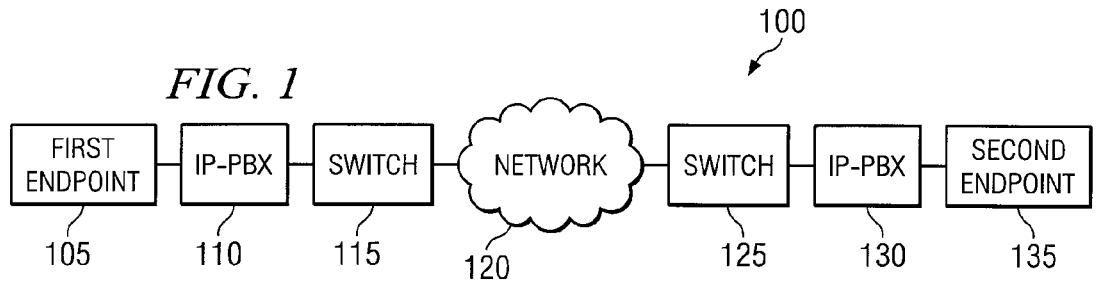
FIG. 1 is a simplified block diagram of a system for maintaining call state information for real-time call sessions in accordance with an embodiment of the present invention.

FIG. 1 is a simplified block diagram of a system 100 for maintaining call state information for real-time call sessions in accordance with an embodiment of the present invention. The system 100 includes a first endpoint 105 connected to a first Internet Protocol-Private Branch Exchange (IP-PBX) 110. The first endpoint 105 may be a variety of communication devices including an IP phone, a mobile terminal, and a personal computer (PC). The first IP-PBX 110 can include a variety of functionalities such as switching between Voice over IP (VoIP) or other packet switched application users and traditional telephone users on the same local lines. The IP PBX 110 is further connected to a first telecommunication switch 115, which functions as a gateway to a communication network 120. The communication network 120 can include a variety of communication networks such as a packet-switched network (e.g., the Internet), a circuit-switched network, and a wireless network.

The communication network 120 is further connected to a second telecommunication switch 125. The second telecommunication switch is connected to a second IP-PBX 130. The second telecommunication switch 125 functions as a gateway between the second IP-PBX 130 and the communication network 120. The second IP-PBX 130 is further connected to a second endpoint 135.

In accordance with an embodiment of the present invention, the system 100 is configured to allow a real-time call session to be established between a first user of the first endpoint 105 and a second user of the second endpoint 135 using one or more communication protocols. The call session can include any type of telecommunication call session including telephone, VoIP, instant messaging, video conferencing Internet Protocol television (IP-TV), gaming, and virtual reality. The one or more communication protocols can include any suitable protocol such as Session Description Protocol (SDP), Session Initiation Protocol (SIP), Real Time Streaming Protocol (RTSP), H.323, or a proprietary protocol.

According to the teachings of various embodiments, a call-setup procedure is performed prior to establishment of the call session between the first endpoint 105 and the second endpoint 135. In some embodiments, the call-setup procedure is initiated by either of the first endpoint 105 and the second endpoint 135. During the call-setup procedure, call session invite and acknowledgement messages are exchanged between the first endpoint 105 and the second endpoint 135. Following call setup and during the duration of the call session, session state information associated with the call session is maintained at each of the first endpoint 105 and the second endpoint 135, for example, in short term storage such as random access memory (RAM) associated with the endpoint 105, 135. In still other embodiments, the session state information is also be maintained at one or more network nodes between the first endpoint 105 and the second endpoint 135, for example, by one or more of the IP-PBX 110, switch 115, switch 125, and endpoint 135. The session state information may include such information as the communication protocols used in the session, any encryption keys required by one or more media stream, and network resources required by the session.

When the first user and the second user no longer wish to use the call session, the call session can be placed into a hibernation mode. To initiate the hibernation mode, one of the first endpoint 105 and the second endpoint 135 transmits a hibernation message to the other endpoint 105, 135. In response to the transmitting and receiving the hibernation message at the first endpoint 105 and second endpoint 135, each of the first endpoint 105 and the second endpoint 135 enter a hibernation mode. In the hibernation mode, the first endpoint 105 stores the session state information in a first storage associated with the first endpoint 105, and the second endpoint 135 stores the session state information in a second storage device associated with the second endpoint 135. In various embodiments of the present invention, the first and second storage device can include a long-term storage device. In at least one embodiment of the present invention, the first and second storage device can include a hard disk, random access memory, flash memory, or any other type of memory storage device.

While in the hibernation mode, at least a portion of the call session is deactivated such that no information associated with the deactivated portion of the call session is transmitted or received between the first endpoint 105 and the second endpoint 135. Additionally, resources associated with the deactivated portion of the call session may be released for use by other call sessions.

In at least one embodiment of the present invention, a call session is comprised of a media portion and a dialogue portion. The media portion includes information related to the payload of the session such as voice and video data. The dialogue portion includes signalling and control information related to the call session. In accordance with the presently described embodiment, at least one of the media portion and the dialogue portion of the call session are placed in a hibernated state.

In accordance with various embodiments, the users of the first endpoint 105 and the second endpoint 135 may be displayed as "buddies" on a buddy list, a closed user group, and the user's speed dial list, or customers of the same service provider. In various embodiments, the hibernation of a call session between two users may be triggered by the absence of a need to communicate over an existing call, or by the presence of a "buddy" in a user's buddy list. Since users on buddy lists are often frequently involved in real-time call session based communications with each other, hibernation of those call sessions may be beneficial.

After the call session has been placed in a hibernated state for a desired period of time, the first and second user may wish to resume the call session. In order to resume the call session, either the first endpoint 105 or the second endpoint 135 sends an activate message to the other endpoint 105, 135. In various embodiments of the present invention, the sending of the activate message from the first endpoint 105 is performed in response to a request from a user of the first endpoint 105. In various other embodiments, the sending of the active message may be performed by the second endpoint 135 in response to a request from a user of the second endpoint 135. In various embodiments, either of the first endpoint 105 and the second endpoint 135 can initiate hibernation and/or initiate resumption of the call session independently of whether call-setup was initiated by the first endpoint 105 or the second endpoint 135.

Upon the sending and receiving of the activate message, the first endpoint 105 retrieves the stored session state information associated with the call session from the first storage device, and the second endpoint 135 retrieves the stored session state information associated with the call session from the second storage device. In accordance with at least one embodiment of the present invention, the session state information is retrieved from the associated storage device and placed in a short-term memory. The call session between the first endpoint 105 and the second endpoint 135 resumes from the state of the call session at which hibernation was initiated.

In embodiments of the invention in which one or more network nodes between the first endpoint 105 and the second endpoint 135 have stored session state information in response to receiving a hibernate message, the one or more network nodes also retrieve the session state information from associated storage devices in response to receiving the activate message.

After it is no longer desired to continue the call session, a BYE message is sent by either the first endpoint 105 or the second endpoint 135. As a result of the sending and receipt of the BYE message, the call session ends, and resources associated with the call session are released.

A component of system 100, such as the first endpoint 105 and the second endpoint 135, may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or a combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

FIG. 2 is a simplified signalling diagram 200 of a procedure for maintaining call state information for a call session in accordance with an embodiment of the present invention. In a step 215, the first endpoint 105 sends an call session invite message (INVITE) 215 which passes through a first network node 205, the communication network 120, and the second network node 210 to be received by the second endpoint 135. The first network node 205 acts as a gateway between the first endpoint 105 and the communication network 120. The second network node 210 acts as a gateway between the second endpoint 135 and the network 120. In response to receiving the invite message 215, the second endpoint 135 sends an acknowledgement message (ACK) 220 to the first endpoint 105 through the second network node 210, the communication network 120, and the first network node 205.

After receipt of the acknowledgement message 220 by the first endpoint 105, a call session 230 is established between the first endpoint 105 and the second endpoint 135. During the call session 230, a first user of the first endpoint 105 and a second user of the second endpoint 135 communicate using the resources established during the call session 230, such as voice, audio, and audio resources.

When the first user of the first endpoint wishes to place the call session 230 in a hibernation state, a hibernate message (HIBERNATE) 235 is sent from the first endpoint 105 to the second endpoint 135 through the first network node 205, the communication network 120, and the second network node 210. In some embodiments, the hibernate message 235 includes a session handle that is used to identify the call session. After sending the hibernate message 235, the first endpoint 105 stores the session state information in a storage device associated with the first endpoint 105 and enters a hibernation mode in a step 240.

After the first network node 205 receives the hibernate message 235, the first network node 205 stores the session state information in a storage device associated with the first network node 205 and enters the hibernation mode in a step 245. After the second network node 210 receives the hibernate message 235, the second network node 210 stores the session state information in a storage device associated with the second network node 210 and enters the hibernation mode in a step 250. After the second endpoint 135 receives the hibernate message 235, the second endpoint 135 stores the session state information in a storage device associated with the second endpoint 135 and enters the hibernation mode in a step 255.

In some embodiments, while the first endpoint 105, the first network node 205, the second network node 210, and the second endpoint 135 are in the hibernation mode, at least a portion of the call session is deactivated such that no information associated with the deactivated portion of the call session is transmitted or received between the first endpoint 105 and the second endpoint 135. In various embodiments, resources associated with the deactivated portion of the call session can be released for use by other call sessions.

In some embodiments, after the call session 230 has been placed in a hibernated state for a desired period of time, the first and second user may wish to resume the call session. In that case, the first endpoint 105 sends an activation message (ACTIVATE) 260 to the second endpoint 135 through the first network node 205, the communication network 120, and the second network node 210.

In accordance with some embodiments of the present invention, when an end user wishes to resume the hibernating call session, the end user can click on a hibernating buddy icon of a graphical user interface (GUI) or an analogous soft-key. In other embodiments, a user can click on a present buddy in a buddy list to initiate the sending of activation message 260. In still other embodiments, the user can push a button, or dial a certain number to initiate the sending of activation message 260.

After sending the activation message 260, the first endpoint 105 retrieves the session state information from the storage device associated with the first endpoint 105 and exits the hibernation mode in a step 265. After the first network node 205 receives the activation message 260, the first network node 205 retrieves the session state information from the storage device associated with the first network node 205 and exits the hibernation mode in a step 270. After the second network node 210 receives the activation message 260, the second network node 210 retrieves the session state information from the storage device associated with the second network node 210 and exits the hibernation mode in a step 275. After the second endpoint 135 receives the activate message 260, the second endpoint 135 retrieves the session state information from the storage device associated with the second endpoint 135 and exits the hibernation mode in a step 280.

In some embodiments of the present invention, the activate message 260 is sent through a previously stored route, and each of the network nodes 205, 210 on that signalling path retrieves the session state information from disk.

In accordance with various embodiments of the present invention, a ringing or other alert may be provided to alert the end users of the first endpoint 105 and/or second endpoint 135 that an activate message 260 has been sent.

In a step 285, the call session is reestablished between the first endpoint 105 and the second endpoint 135 using the session state information retrieved by each of the first endpoint 105, the first network node 205, the second network node 210, and the second endpoint 135. During the reestablished call session, the first user of the first endpoint 105 and the second user of the second endpoint 135 resume the call session in the same call state as before the hibernation mode was entered.

In accordance with some embodiments of the present invention, if resource reservation fails when an attempt is made to transition from the hibernation mode to the active mode, or the other endpoint 105, 135 is not capable of transitioning to the active state, then the party attempting the transition can be provided with a busy response or some other appropriate response indicative of the transition failure. In some embodiments, hibernated calls that have not transitioned to the active state by a certain time limit may be ended without being refreshed. In some embodiments, if an alerted user of the first endpoint 105 or the second endpoint 135 does not answer a request to resume a hibernated call, the transition of the call session from a hibernation state to an active state will fail, and the call session will remain in a hibernated state in anticipation of the successful resumption of a future call.

In some embodiments, after it is no longer desired to continue the call session between the first endpoint 105 and the second endpoint 135, a call session termination message (BYE) 290 is transmitted from the first endpoint 105 to the second endpoint 135 through the first network node 205, the communication network 120, and the second network node 210. As a result of the transmission and reception of the call session termination message (BYE) 290, the call session is ended, and the first endpoint 105, the first network node 205, the second network node 210, and the second endpoint 135 are returned to an idle state. In some embodiments, resources consumed by the call session are released for use in other network communications when transitioning to the idle state.

In accordance with some embodiments of the present invention, if an endpoint 105, 135 gracefully goes offline, associated hibernating sessions are ended. In some embodiments, the endpoint 105, 135 going offline has the responsibility to end the hibernating session. In some embodiments, endpoints 105, 135 may not be well behaved or may unintentionally go offline. For example, a mobile endpoint may go out of range and be unable to move to another access base station. Accordingly, in some embodiments, the endpoint 105, 135 may monitor for the presence of all of the endpoints 105, 135 that are participating in its hibernated call session. If such a monitored endpoint 105, 135 abruptly goes offline, this may trigger the monitoring endpoint 105, 135 to end the associated hibernated call session.

In accordance with some embodiments in which endpoints 105, 135 are mobile endpoints operating in the context of a mobile session service, an offline timer may be triggered at the monitoring endpoint 105, 135 if the monitoring endpoint 105, 135 momentarily goes offline due to a temporary loss in radio connectivity. If a predetermined time period of the offline timer expires before the endpoint 105, 135 goes back online, then the endpoint 105, 135 may end the associated hibernating session.

Some of the steps discussed with reference to FIG. 2 may be changed or deleted where appropriate and additional steps may also be added to these process flows. These changes may be based on specific communication architectures or particular interfacing arrangements and configurations of associated elements and do not depart from the scope or the teachings of the present invention.

Figure 3:
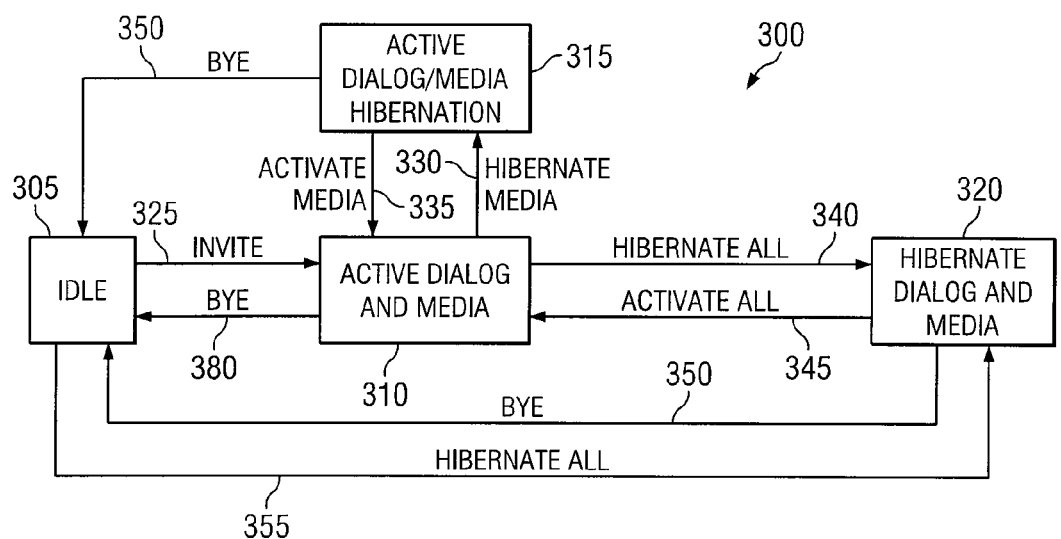
FIG. 3 is a simplified diagram of a state machine in accordance with an embodiment of the present invention.

FIG. 3 is a simplified diagram of a state machine 300 in accordance with an embodiment of the present invention. The state machine can be embodied within an endpoint and/or network node, such as the first endpoint 105, the second endpoint 135, the first network node 205, and the second network node 210 described with respect to FIG. 2. The simplified state machine includes four states: an idle state, an active dialog and media state 310, an active dialog/media hibernation state, and a hibernate dialog and media state 320.

In the idle state 305, no call session has been established and network resources associated with a call session are not being consumed. Upon receipt of an INVITE message, the state machine 300 transitions to the active dialog and media state 310. In the active dialog and media state 310, a call session is established and dialog and media session streams are transmitted and received. During the active dialog and media state, session state information, including dialog session state information and media session state information, associated with the call session is maintained. The dialog session state information includes signalling information and call context state information associated with the call session. The media session state information includes media packets associated with the call session. In some embodiments, the media session state information may further include information defined by the particular codec used to encode the media packets, such as the options or parameters associated with the codec that are used in encoding the media packets. In some embodiments, the media session state information stored in the first network node 205 and/or the second network node 210 may include gating information and/or bandwidth allocations associated with policy decisions that define the volume and pacing of packets sent through the first network node 205 and/or the second network node 210.

While in the active dialog and media state 310, receipt of a hibernate media message 330 will transition the state machine 300 into the active dialog/media hibernation state 315. An example hibernate media message 330 can include a re-INVITE message with an SDP indication to hibernate media. In the active dialog/media hibernation state 315, the media session state information associated with the call session is stored in a storage device and the media resources associated with one or more media of the call session are released, but dialog state information for the call session is maintained. In this state, a call session is active while one or more media are in the hibernation state. In some embodiments, no media information will be sent and received associated with media in the hibernation state. For example, in some embodiments, no Real-time Transport Protocol (RTP) media or keep-alive messages are sent and quality-of-service (QoS) reservations are released.

While in the active dialog/media hibernation state 315, receipt of an activate media message 335 cause the state machine 300 to transition to the active dialog and media state 310. An example activate media message 335 can include a re-INVITE with an SDP indication to activate media. During the transition to the active dialog and media state 310, the media session state information associated with the call session is retrieved from the storage device and the call session is resumed with both active dialog and media streams.

While in the active dialog and media state 310, receipt of a hibernate all message 340 causes the state machine 300 to transition to the hibernate dialog and media state 320. An example hibernate all message 340 can include a re-INVITE with an SDP indication to hibernate media and dialog. In some embodiments, a separate message type may be used for call-setup, call hibernation, media hibernation, call activation, and media activation. The hibernate all message 340 may include a "handle" to identify the call session and associate the call session with the associated session state information. In the hibernate dialog and media state 320, the dialogue session state information and the media session state information associated with the call session are stored in the storage device and the dialog resources and media resources associated with the call session are released in some embodiments.

While in the hibernate dialog and media state 320, receipt of an activate all message 345 causes the state machine 300 to enter the active dialog and media state 310. Upon entering the active dialog and media state 310 from the hibernate dialog and media state 320, the dialog session state information and the media session state information associated with the call session are retrieved from the storage device, and the call session is resumed with active dialog and media streams. In some embodiments, the activate all message 345 may include the session handle to identify the hibernate call session that is to be activated.

While in the active dialog/media hibernation state 315, the active dialog and media state 310, and the hibernate dialog and media state 320, receipt of a BYE message 350 causes the state machine 300 to return to the Idle state 305.

In accordance with some embodiments, a call session may be set up and held in a hibernation mode prior to activation of the call session. In such a situation, receipt of a hibernate all message 355 while the state machine is in the idle state 305, causes the state machine 300 to transition to the hibernate dialog and media state 320 in which the dialogue session state information and the media session state information associated with the call session are stored in the storage device. When it is desired to activate the call session, the activate all message 345 is received, and the state machine transitions to the active dialog and media state 310 in which the dialog session state information and the media session state information associated with the call session are retrieved from the storage device and the call session is begun with active dialog and media streams.

An example according to at least one embodiment in which it may be desirable to set-up a call session and hold the call session in a hibernation mode prior to the activation of the call session is when a user wishes to add a person to the user's buddy list prior to communicating with the person. By the user adding the person to the buddy list, a hibernation session is established. In another example, a user may have one or more call sessions in a hibernation state prior to going offline and shutting down the user's computer. Upon subsequent boot-up and going online by the user's computer, the hibernating sessions may be reestablished even if the user has not previously communicated with a user on a buddy list.

Although the state machine 300 of FIG. 3 is described as being capable of two levels of hibernation including media path only, and dialog and media paths, it should be understood that in certain embodiments the state machine 300 can be modified to only support one or more hibernation levels.

In accordance with some embodiments, session state information for a call session can be stored in any stateful node of one or more communication networks in response to receiving a hibernation message. For example, the session state information can be stored in endpoints 105, 135, by a service provider, or in both as a cooperative service offering.

In some embodiments, an endpoint 105, 135 may be limited to a configurable number of concurrent hibernating sessions. In such cases, self pruning rules may be defined to ensure that the number of concurrent hibernating session for the endpoint 105, 135 stays within such a limit. In some embodiments, a new hibernating session may replace the oldest hibernating session when the limit is reached.

Although embodiments of the present disclosure have been described with respect to call session between two endpoints, it should be understood that the principles of the present disclosure may be applied to call sessions involving three or more endpoints.

Although embodiments of the present disclosure have been described with respect to call sessions, it should be understood that the principles of the present disclosure may be applied to any communication session between two or more endpoints. For example, the principles of the present disclosure may be applied to session-based real-time applications and services such as session-based live broadcast television, session-based multiplayer online virtual reality gaming, and session based virtual reality oriented enterprise collaboration.

In some embodiments, one of the endpoints 105, 135 may include a media server or other automated content delivery device, and the other endpoint 105, 135 may include a user terminal such as a set-top box or personal computer. In some of these embodiments, the media server provides content to the user terminal during a communication session upon request by a user. One or more communication sessions are set-up and placed in a hibernated state prior to the time at which the content provided by the communication session is to be delivered. At the time at which the content is desired to be delivered, the one or more communication sessions are transitioned to an active state. In the active state, the content provided by the one or more communication sessions is delivered by the media server to the user terminal.

In some embodiments, the delivered content includes one or more live broadcast channels. In at least one embodiment, a communication session associated with each of the one or more live broadcast channels is hibernated in advance, and the communication session associated with a particular live broadcast channel is transitioned to an active state upon a user changing to the particular live broadcast channel.

Although embodiments of the present disclosure have been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of facilitating communication sessions, comprising:

performing a setup procedure for a communication session between a first endpoint and a second endpoint to define first session state information associated with the communication session and second session state information associated with the communication session;

establishing the communication session, wherein the first session state information is stored in a first primary memory of the first endpoint and the second session state information is stored in a second primary memory of the second endpoint;

sending a hibernation message from the first endpoint and receiving the hibernation message by the second endpoint;

entering a hibernation mode, entering the hibernation mode comprising:

storing, by the first endpoint, the first session state information in a first long-term memory storage device associated with the first endpoint;

storing, by the second endpoint, the second session state information in a second long-term memory storage device associated with the second endpoint in response to receiving the hibernation message; and releasing resources associated with the communication session, releasing resources comprising:

releasing the first session state information from the first primary memory after the storing of the first session state information in the first long-term memory storage device, and releasing the second session state information from the second primary memory after the storing of the second session state information in the second long-term memory storage device; and after entering the hibernation mode, resuming the communication session without repeating the setup procedure, resuming the communication session comprising:

retrieving the first session state information from the first long-term memory storage device and restoring the first session state information to the first primary memory, and retrieving the second session state information from the second long-term memory storage device and restoring the second session state information to the second primary memory.

2. The method of claim 1, wherein the first session state information comprises a first media session state.

3. The method of claim 2, wherein the first media session state comprises at least one of the following:

information relating to one or more communication protocols used in the communication session;

information relating to encryption used in the communication session;

gating information relating to the communication session; and bandwidth allocation information relating to the communication session.

4. The method of claim 1, wherein the first session state information comprises a first media session state and a first dialog state.

5. The method of claim 4, wherein the first dialog state comprises at least one of the following:

control information relating to the communication session; and signalling information relating to the communication session.

6. The method of claim 1, wherein the second session state information comprises a second media session state.

7. The method of claim 6, wherein the second media session state comprises at least one of the following:

information relating to one or more communication protocols used in the communication session;

information relating to encryption used in the communication session;

gating information relating to the communication session; and bandwidth allocation information relating to the communication session.

8. The method of claim 1, wherein the second session state information comprises a second media session state and a second dialog state.

9. The method of claim 1, wherein resuming the communication session further comprises sending an activate message from the first endpoint and receiving the activate message by the second endpoint; and wherein retrieving the second session state information occurs in response to the receiving of the activate message by the second endpoint.

10. The method of claim 9, wherein the sending of the activate message from the first endpoint is performed in response to a request from a user of the first endpoint.

11. The method of claim 1 further comprising receiving the hibernation message by at least one network node connected between the first endpoint and the second endpoint; and wherein entering the hibernation mode further comprises storing, by the at least one network node, session state information associated with the communication session in at least one long-term memory storage device associated with the at least one network node in response to receiving the hibernation message; and wherein releasing resources further comprises releasing the session state information from a primary memory of the at least one network node after the storing of the session state information in the at least one long-term memory storage device.

12. The method of claim 11 wherein resuming the communication session further comprises:

receiving an activate message sent by the first endpoint at the at least one network node; and retrieving, by the at least one network node, the session state information from the at least one long-term memory storage device and restoring the session state information into the primary memory of the at least network node in response to receiving the activate message.

13. A method for facilitating communication sessions comprising:

performing a setup procedure for a communication session between a first endpoint and a second endpoint to define session state information associated with the communication session;

receiving a hibernation message by at least one network node;

entering a hibernation mode, entering the hibernation mode comprising:

storing, by the at least one network node, the session state information associated with the communication session established between the first endpoint and the second endpoint in at least one long-term memory storage device associated with the at least one network node in response to receiving the hibernation message;

releasing resources associated with the communication session, the releasing of resources comprising releasing the session state information from a primary memory associated with the at least one network node after the storing of the session state information in the at least one long-term memory storage device; and after entering the hibernation mode, resuming the communication session without repeating the setup procedure, resuming the communication session comprising retrieving the session state information from the at least one long-term memory storage device and restoring the session state information to the primary memory.

14. The method of claim 13, wherein the at least one network node comprises the first endpoint.

15. The method of claim 13, wherein the at least one network node comprises the second endpoint.

16. The method of claim 13, wherein the at least one network node comprises a network node connected between the first endpoint and the second endpoint.

17. The method of claim 13, wherein releasing resources further comprises releasing network resources associated with the communication session.

18. The method of claim 13, wherein the session state information comprises a media session state.

19. The method of claim 18, wherein the media session state comprises at least one of the following:

information relating to one or more communication protocols used in the communication session;

information relating to encryption used in the communication session;

gating information relating to the communication session; and bandwidth allocation information relating to the communication session.

20. The method of claim 13, wherein the session state information comprises a media session state and a dialog state.

21. The method of claim 20, wherein the dialog state comprises at least one of the following:
control information relating to the communication session, and
signalling information relating to the communication session.

22. The method of claim 13, wherein resuming the communication session further comprises receiving an activate message by the at least one network node, and wherein retrieving the session state information occurs in response to the receiving of the activate message.

23. The method of claim 22, wherein the activate message is sent to the at least one network node in response to a request from a user of the first or the second endpoint.

24. An apparatus comprising:
a network node, the network node including:
at least one processor, the at least one processor being operable to:
perform a setup procedure for a communication session between a first endpoint and a second endpoint to define session state information associated with the communication session;
receive a hibernation message;
enter a hibernation mode, entering the hibernation mode comprising:
storing, in at least one long-term memory storage device, the session state information associated with the communication session established between the first endpoint and the second endpoint in response to receiving the hibernation message;
releasing resources associated with the communication session, the releasing of resources comprising releasing the session state information from primary memory associated with the network node after the storing of the session state information in the long-term memory storage device; and
after entering the hibernation mode, resume the communication session without repeating the setup procedure, resuming the communication session comprising retrieving the session state information from the at least one long-term memory storage device and restoring the session state information to the primary memory.

25. The apparatus of claim 24, wherein the network node comprises the first endpoint.

26. The apparatus of claim 24, wherein the network node comprises the second endpoint.

27. The apparatus of claim 24, wherein the network node comprises a network node connected between the first endpoint and the second endpoint.

28. The apparatus of claim 24, wherein releasing resources further comprises releasing network resources associated with the communication session.

29. The apparatus of claim 24, wherein the session state information comprises a media session state.

30. The apparatus of claim 29, wherein the media session state comprises at least one of the following:
information relating to one or more communication protocols used in the communication session;
information relating to encryption used in the communication session;
gating information relating to the communication session; and
bandwidth allocation information relating to the communication session.

31. The apparatus of claim 24, wherein the session state information comprises a media session state and a dialog state.

32. The apparatus of claim 31, wherein the dialog state comprises at least one of the following:
control information relating to the communication session; and
signalling information relating to the communication session.

33. The apparatus of claim 24, wherein resuming the communication session further comprises receiving an activate message, and wherein retrieving the session state information occurs in response to the receiving of the activate message.

34. The apparatus of claim 33, wherein the activate message is sent to the network node in response to a request from a user of the first or the second endpoint.

35. A non-transitory computer-readable medium embodying logic for facilitating communication sessions, the logic being operable when executed by a computer to:
perform a setup procedure for a communication session between a first endpoint and a second endpoint to define session state information associated with the communication session;
receive a hibernation message by at least one network node;
enter a hibernation mode, entering the hibernation mode comprising:
storing, by the at least one network node, the session state information
associated with the communication session established between the first endpoint and the second endpoint in at least one long-term memory storage device associated with the at least one network node in response to receiving the hibernation message and
releasing resources associated with the communication session, the releasing of resources comprising releasing the session state information from a primary memory associated with the computer after the storing of the session state information in at least one long-term memory storage device; and
after entering the hibernation mode, resume the communication session without repeating the setup procedure, resuming the communication session comprising retrieving the session state information from the at least one long-term memory storage device and restoring the session state information to the primary memory.

36. A method of facilitating communication sessions, comprising:
performing a setup procedure for a communication session between a first endpoint and a second endpoint to define first session state information associated with the communication session and second session state information associated with the communication session;
establishing the communication session, wherein the first session state information is stored in a first primary memory of the first endpoint and the second session state information is stored in a second primary memory of the second endpoint
sending a hibernation message from the first endpoint and receiving the hibernation message by the second endpoint;

entering a hibernation mode, entering the hibernation mode comprising:

storing, by the first endpoint, the first session state information a first long-term memory storage device associated with the first endpoint;

storing, by the second endpoint, the second session state information in a second long-term memory storage device associated with the second endpoint in response to receiving the hibernation message;

releasing resources associated with the communication session, the releasing of resources comprising:

releasing the first session state information from the first primary memory after the storing of the first session state information in the first long-term memory storage device, releasing the second session state information from the second primary memory after the storing of the second session state information in the second long-term memory storage device, and releasing network resources associated with the communication session, and ceasing communication between the endpoints; and after entering the hibernation mode, resuming the communication session in the same state as before the hibernation mode was entered, resuming the communication session comprising:

retrieving the first session state information from the first long-term memory storage device and restoring the first session state information to the first primary memory, retrieving the second session state information from the second long-term memory storage device and restoring the second session state information to the second primary memory, reacquiring network resources associated with the communication session, and resuming communication between the endpoints.

37. The method of claim 36, wherein the first session state information comprises a first media session state and a first dialog state, and wherein the second session state information comprises a second media session state and a second dialog state, each dialog state comprising at least one of the following:

control information relating to the communication session, and signalling information relating to the communication session.

\* \* \* \* \*